Nov. 6, 1928.

E. G. LIVESAY 1,690,372

TOWING APPARATUS

Original Filed Oct. 10, 1925   3 Sheets-Sheet 1

Inventor
EVERETT G. LIVESAY
By
Attorney

Nov. 6, 1928.
E. G. LIVESAY
1,690,372
TOWING APPARATUS
Original Filed Oct. 10, 1925   3 Sheets-Sheet 2
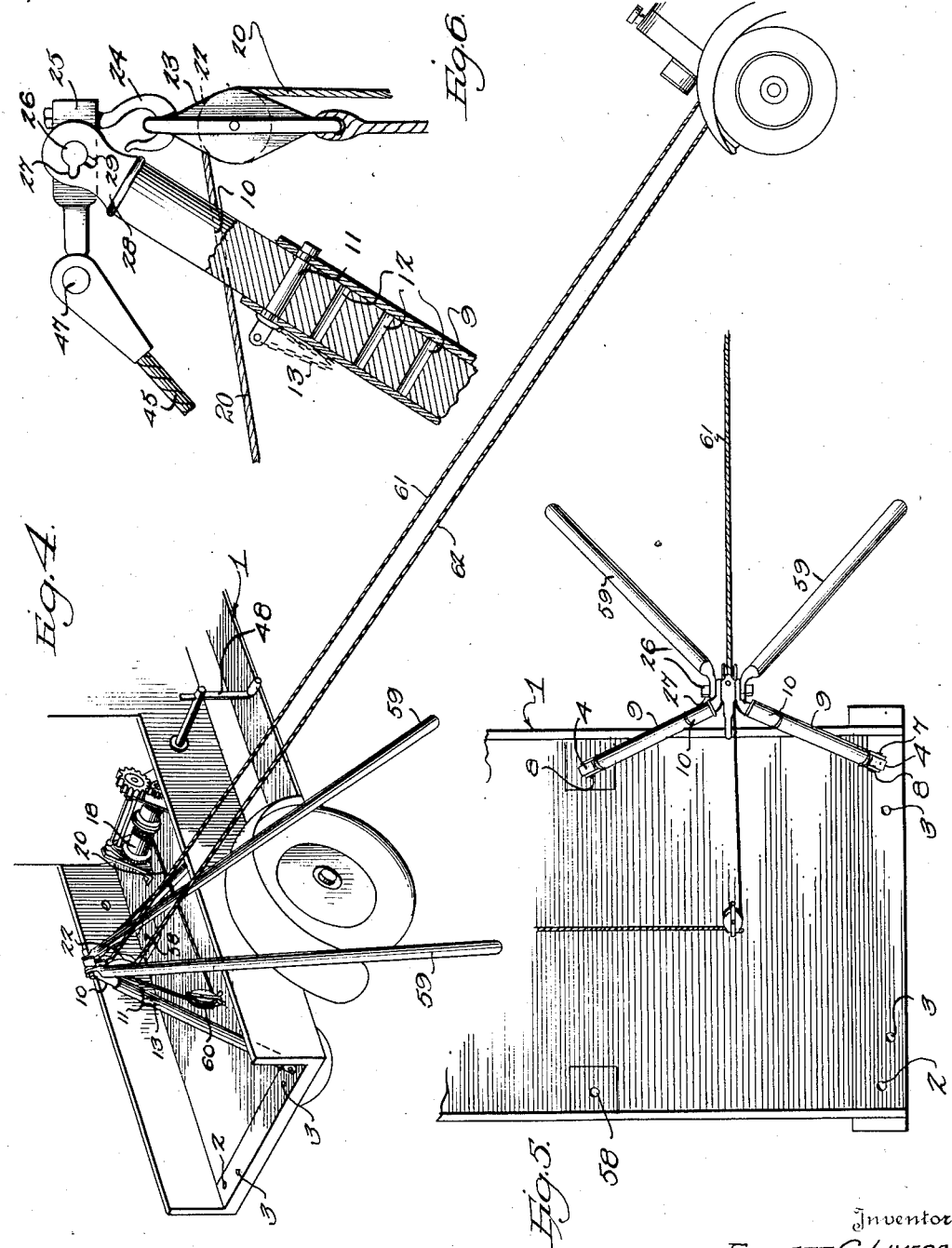
Inventor
EVERETT G. LIVESAY Nov. 6, 1928.
E. G. LIVESAY
1,690,372
TOWING APPARATUS
Original Filed Oct. 10, 1925   3 Sheets-Sheet 3
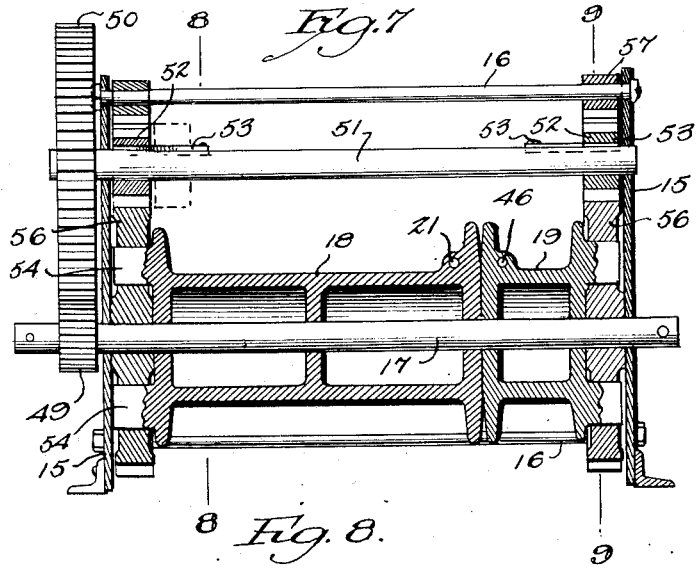
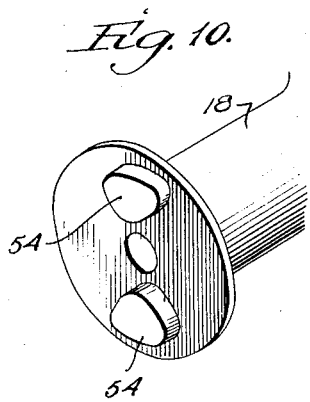
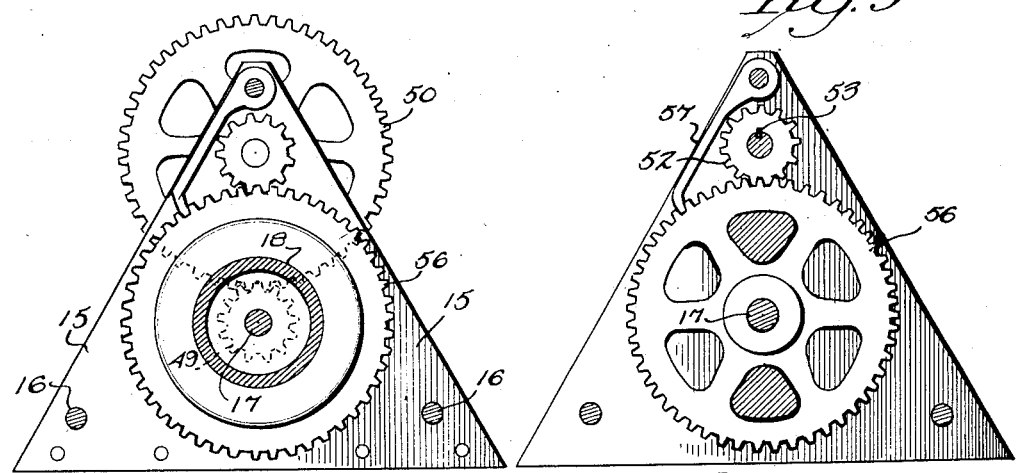
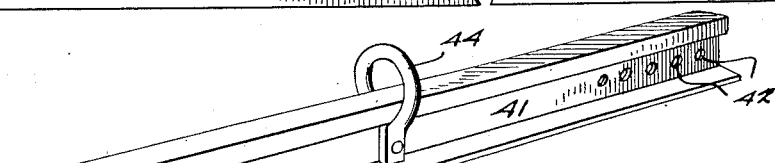
Inventor
EVERETT G. LIVESAY
Attorney Patented Nov. 6, 1928.

1,690,372

UNITED STATES PATENT OFFICE.

EVERETT GREY LIVESAY, OF DAYTON, OHIO.

TOWING APPARATUS.

Application filed October 10, 1925. Serial No. 61,763. Renewed October 11, 1926.

This invention relates to a vehicle towing apparatus and more particularly to means for connecting a crane or boom mounted on a motor vehicle with a disabled motor car to enable the latter to be lifted and towed.

One object of the invention is to provide a towing apparatus which may be quickly and easily attached to a disabled vehicle and connected with a towing truck and the hoisting mechanism thereon.

A further object of the invention is to provide such an apparatus which will retain the disabled vehicle in proper relation to the towing truck, while it is being towed, and will cause the disabled vehicle to follow substantially in the tracks of the truck.

A further object of the invention is to provide such an apparatus which will be of a strong durable character and which when not in use will occupy but little space.

Other objects of the invention will appear as the apparatus is described in detail.

Figure 1:
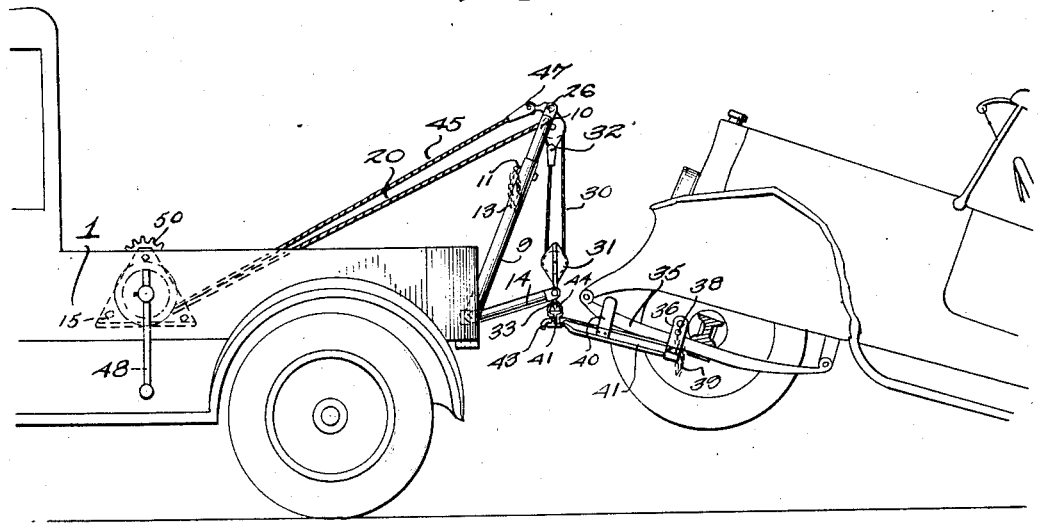
Figure 2:
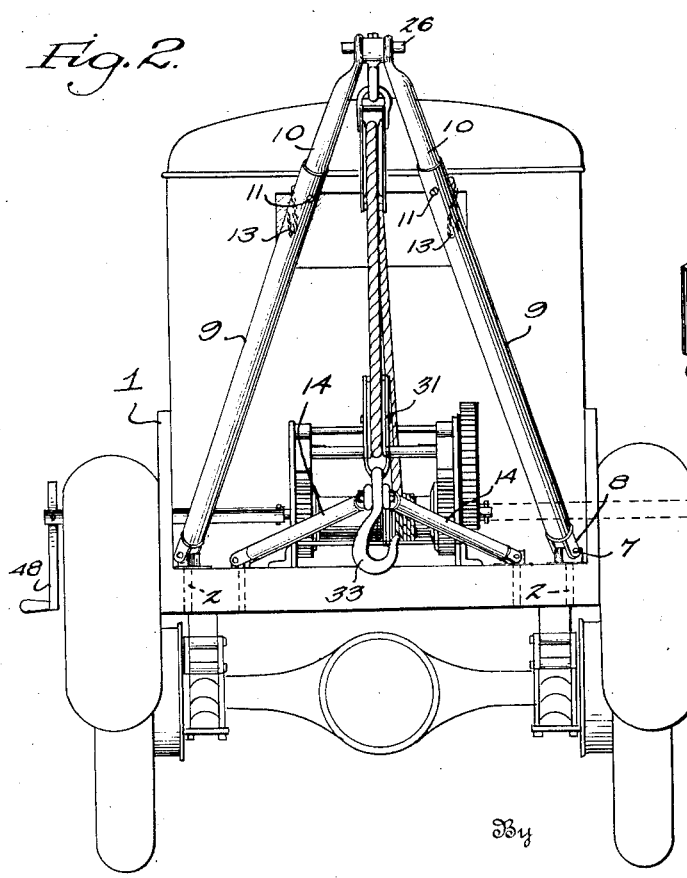
Figure 3:
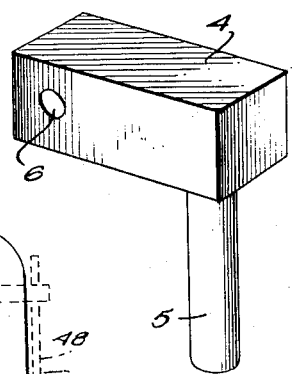

In the accompanying drawings, I have shown one embodiment of the invention. In this showing:

Figure 1 is a side elevation showing the crane in position on a motor truck and attached to a vehicle to be towed, Figure 2 is a rear elevation of a motor truck showing the crane in position, Figure 3 is a perspective view of one of the supporting members by means of which the booms are removably mounted in the floor of the truck, Figure 4 is a perspective view showing the crane arranged transversely of the truck, Figure 5 is a plan view of the apparatus shown in Figure 4, Figure 6 is a side elevation of the upper end of the booms shown in Figure 2 of the drawings, parts being shown in section, Figure 7 is a vertical longitudinal sectional view of the drum arranged within the vehicle, Figure 8 is a vertical sectional view on line 8—8 of Figure 7, Figure 9 is a similar view on line 9—9 of Figure 7, Figure 10 is a detail view of one end of one of the drums, and, Fig. 11 is a perspective view of a portion of the towing apparatus by means of which the disabled vehicle is connected with the towing vehicle.

Referring to Figures 1 to 3 of the drawings, the reference numeral 1 designates generally a motor truck on which the apparatus is mounted. In the floor of the vehicle adjacent the rear end, I provide a pair of openings 2 (see Figure 2) and inwardly of these openings, I provide a similar pair of openings 3. The main boom is adapted to be supported by blocks 4 mounted in the openings 2 and the auxiliary boom is adapted to be similarly supported by similar blocks arranged in the openings 3. As shown, each of these blocks is provided with a depending pin 5 which is received in one of the openings to anchor the block and the block is further provided with an opening 6 adapted to receive a pivot pin 7 which passes through ears 8 formed at the bottom of the boom. The main boom is substantially V-shaped and consists of a pair of arms 9 which are hollow and which are adapted to receive extensions 10 (see Figure 6). The hollow portions of the arms are provided with a pair of alined openings adapted to receive a pin 11 which may be mounted in any one of a selected number of openings 12 in the telescoping portion of the arm. The pin 11 may be secured to the arm by means of a chain 13 to prevent loss.

The auxiliary boom is likewise formed of a pair of arms 14 providing a substantially V-shaped member and is arranged beneath the main boom and projects from the rear of the vehicle in a substantially horizontal plane.

Referring to Figure 7 of the drawings, the apparatus within the vehicle consists of a pair of side plates 15 suitably anchored to the floor of the truck and secured to each other by means of bolts or rods 16. A main shaft 17 is journaled in these plates and a pair of drums 18 and 19 are loosely mounted about the axis of the shaft for rotation relatively one to the other and to the shaft. A rope 20 is arranged on the drum 18 with the end of the rope secured in an opening 21 in the drum. This rope passes upwardly over a pulley 22 carried by a block 23. The block 23 is provided with an eye for the reception of the hook 24. This hook is carried by a supporting member 25 arranged at the upper end of the main boom. As shown, the supporting member is provided with a projecting lug 26 at each side and these lugs are provided with laterally extending keys 27 adjacent their outer ends. The upper end of each arm of the main boom is provided with a cap 28 having a central opening for the reception of the lug 26. The central opening is provided with a lateral extension 29 for the reception of the key 27 so that when the supporting member is arranged in position and rotated to bring the opening 29 out of alinement with the key 27, as shown in Figure 6 of the drawings, the two booms of the main boom are locked in position.

From the pulley 22, the rope 20 is extended downwardly as indicated at 30, and passes over a pulley in a block 31. The rope is then extended upwardly and secured to the bottom of the block 23, as indicated at 32.

A sheave block 31, which is supported by the lower end of the portion 30 of the cable, is secured to a hook 33 which is carried by the auxiliary boom and is adapted to engage the clamping or towing apparatus which is secured to the vehicle to be towed. The towing apparatus is shown in operative position in Fig. 1 of the drawings and is shown in detail in Fig. 11.

As there shown, it comprises a pair of elongated supporting members or bars adapted to extend beneath and longitudinally of the disabled vehicle and having means for firmly securing the same to the disabled vehicle. The forward ends of the supporting members extend beyond the forward end of the disabled vehicle, that is, the end adjacent to the towing truck, it being understood that either end of the towed vehicle may be connected with the truck. The forward ends of the supporting members are connected one to the other by a suitable connecting member which in turn is connected with the hook 33 of the hoisting mechanism on the truck. In the particular construction here illustrated supporting members comprise bars 34 adapted to be arranged beneath and secured in supporting engagement with the lower edges of the springs at the respective sides of the disabled automobile. Each bar is provided near its rear end with upwardly extending parts, such as the ears 36, which embrace the spring and are secured thereto by means of a pin 38 which extends through openings 37 in the ears 36 above the spring. The pin may be secured to the bar by means of a chain to prevent its loss. At a point in advance of the ears 36 and near the forward end of the spring each bar is provided with a second pair of upwardly extending parts or ears 40 which also embrace the spring and hold the bar against lateral displacement with relation thereto. The forward ends of the bars, which project beyond the ends of the springs, are connected with a rigid transverse member or bar 41. In the present instance, the forward end of each bar 34 is reduced in size and turned downwardly, as shown at 43, so that it may be inserted through an opening 42 in the bar 41 and when in a substantially horizontal position will be retained in that opening. Preferably the bar 41 has a series of openings near each end thereof to accommodate the same to vehicles of different widths. The bar 41 is provided with an eye or ring 44 to receive the hook 33 on the hoisting mechanism. The hook 33 being firmly secured to the supplemental boom 14 it will be apparent that the supplemental boom and the towing device will support the forward end of the towed vehicle in proper relation to the towing truck, that is, will prevent the towed vehicle from running into the truck when the latter is going down grade or when the brakes are suddenly applied. The connection between the towing apparatus and the supplemental boom being a pivotal one the towed vehicle will be caused to follow substantially in the tracks of the towing truck and will be steered by that truck. The pull exerted on the bars 34 by the transverse bar 41 will cause the towed vehicle to move with the truck and should the supporting bars 34 tend to slip on the spring the forward ears or plates 40 will engage the forward ends of the springs and positively limit the movement of the supporting bars with relation to the springs.

The drum 19 is adapted to receive a rope 45, the end of which is secured in an opening 46 in the drum and the other end of this rope is secured to the supporting member 25 at the top of the main boom, as indicated at 47, to permit the main boom to be elevated.

The means for operating the apparatus consists of a handle 48 adapted to be secured to either end of the shaft 17. As shown (see Figure 4) the shaft may project through suitable openings in the sides of the truck. This shaft is provided with a pinion 49 meshing with a gear 50 carried by a shaft 51. Adjacent each end, the shaft 51 is provided with a pinion 52 which is keyed thereto by means of a key 53 to permit the pinion to be adjusted longitudinally of the shaft. The outer end of each drum is provided with projections 54 which are adapted to be received in openings 55 of gears 56 to couple the gear to the drum and permit it to revolve loosely on the shaft 17. The upper supporting rod 16 is adapted to receive a pawl 57 which prevents reverse movement of the drums.

In the form of the invention shown in Figures 4 and 5 of the drawings, the crane is arranged for lifting a vehicle at the side of the road with a wrecking truck arranged on the road at one side thereof and thus not interfering with traffic. This is accomplished by arranging the main boom with its base portion extending lengthwise of the truck and to this end I have provided the body of the truck with additional openings 58 arranged near the sides of the truck and some distance in front of the openings 2. When the boom is to be mounted for a transverse pull the supporting member 4 of one of the boom arms is removed from the opening 2 and inserted in the opening 58 at the same side of the truck with the opening 2 in which the other boom arm is mounted. As the supplemental boom is not used for a transverse pull it may be entirely removed. I further provide secondary booms 59 which are adapted to project over the side of the vehicle and rest on the ground. The rope 20 is then carried from the drum 19 over a pulley 60 mounted in the floor of the vehicle, thence upwardly over the pulley 22, thence to the disabled vehicle in a line at right angles to the body of the drum, as indicated at 61, and thence returned and fastened on the block 23, as heretofore described, as indicated at 62.

The operation of the device will be apparent from the foregoing description. The drum 18 is revolved by actuating the shaft 17 with the gear 52 at the left in Figure 7 of the drawings in its full line position, meshing with the gear 56. If the drum 19 is not to be revolved, the gear 53 at the right is moved out of mesh with the gear 56. Similarly, the drum 19 can be revolved and the drum 18 remain stationary by reversing the position of the gears, moving the gear 53 at the left to the dotted line position shown and arranging the gear 53 in the full line position. The rope 45 carried by the drum 19 elevates the boom and the rope 20 lifts the load. It will be apparent that the towed vehicle is connected to the towing vehicle by a single pivotal connection between the hook 33 and the member 44 which permits free steering. The auxiliary booms 14 arranged in a substantially horizontal position together with the transverse member 41 of the clamping apparatus, prevent the towed vehicle from crashing into the rear of the towing vehicle if the brakes should be suddenly applied to the towing vehicle and thus prevent injury to either of the vehicles.

The arrangement shown in Figures 4 and 5 of the drawings is particularly advantageous in lifting a wrecked car where the line of force must be applied at right angles to the roadway. If this force must be applied from the back of the wrecking truck, the wrecking truck must assume a position across the road which seriously interferes with traffic and by providing the means for applying the line of force transversely of the wrecking car, I permit it to be arranged at the side of the road in the normal parked position, and thus not interfere with traffic.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. In a vehicle towing apparatus, a supporting device comprising a pair of longitudinally extending members adapted to be arranged beneath the front springs of the towed vehicle, said members being provided with side plates adapted to engage the sides of the spring to prevent displacement, and being further provided with reduced forward ends, a transverse member having openings adjacent each end for the reception of the reduced ends of said longitudinally extending members, and means for supporting the load substantially centrally of said transverse member.

2. In a towing apparatus, a pair of elongated members adapted to extend beneath and lengthwise of longitudinally extending parts of a vehicle which is to be towed, a pair of plates secured to each of said members near the rear end thereof and arranged to extend upwardly on opposite sides of the corresponding part of said vehicle, means cooperating with said plates to connect said member with said part of said vehicle, a second pair of plates secured to each of said members in front of the first mentioned plates and arranged to engage the opposite sides of said part of said vehicle, a supporting structure adapted to be carried by a towing vehicle, and means for connecting said supporting structure with the forward portions of said members.

3. In a towing apparatus, a pair of elongated members adapted to extend lengthwise beneath and in supporting engagement with longitudinally extending parts of a vehicle which is to be towed, means for connecting said members with the respective longitudinal parts of said vehicle and for holding the same against lateral displacement with relation to said parts, said members having hook shaped portions at their forward ends, and a transverse bar having openings to receive said hook shaped portions and having means for connecting the same with a supporting structure carried by a towing vehicle.

4. In a towing apparatus, a pair of elongated members adapted to be arranged in parallel relation beneath and in supporting engagement with the respective longitudinally extending springs of a vehicle which is to be towed, means for retaining said members in supporting engagement with the respective springs, and means for connecting the forward portions of said members with a supporting structure carried by a towing vehicle.

5. In a towing apparatus, a pair of separate elongated members adapted to extend lengthwise beneath and in supporting engagement with the respective longitudinally extending springs of a vehicle which is to be towed, means for connecting the rear ends of said members with the respective springs, means engaging said springs to hold said members against lateral displacement with relation thereto, and means for connecting the forward portions of said members one with the other and with a supporting structure carried by a towing vehicle.

6. In a towing apparatus, a pair of separate elongated members adapted to extend lengthwise beneath and in supporting engagement with the respective longitudinally extending springs of a vehicle which is to be towed, means for connecting the rear ends of said members with the respective springs, means engaging said springs to hold said members against lateral displacement with relation thereto, and a transverse bearing detachably connected with the forward ends of said members and having means for connecting the same with a supporting structure carried by a towing vehicle.

7. In a vehicle towing apparatus, a supporting device comprising a pair of separate elongated members adapted to be arranged in parallel relation beneath a vehicle near the respective sides thereof and having means for attaching the same to said vehicle, a transverse member having means for connecting the same with the forward ends of said elongated members and also having an eye near the center thereof, lifting mechanism adapted to be mounted on a towing truck and comprising a hook to engage said eye, and a pair of rearwardly converging arms having means for mounting the same on said truck and having their rear ends directly connected with said hook.

In testimony whereof, I affix my signature.

EVERETT GREY LIVESAY.